UNITED STATES PATENT OFFICE 2,675,396

STEROID ALDEHYDES AND PROCESS

Robert B. Woodward, Belmont, Mass., assignor to Research Corporation, New York, N. Y., a corporation of New York No Drawing. Application May 19, 1953, Serial No. 356,086

5 Claims. (Cl. 260—397.45)

This application relates to methods and compounds useful in the production of steroids.

In application Serial No. 220,977 filed April 13, 1951, is disclosed methods and compounds whereby the cis-adduct of 1,3-butadiene and 2-methyl-5-methoxybenzoquinone may be converted into a D-homosteroid of the formula

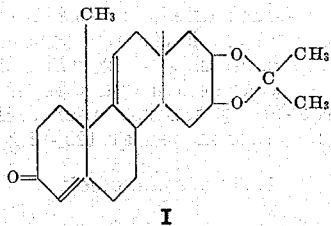

I (3 - keto - 16,17 - dihydroxy - $\Delta^{4,9(11)}$-D - homo-androstadiene acetonide) capable of further conversion into steroid hormones.

This application relates to methods whereby the D-homosteroid (I) may be converted to progesterone and related steroids and to the useful intermediate products thereby produced.

The D-homosteroid (I) is hydrogenated in the presence of palladium black and an alkali to the A/B-cis dihydro derivative (II).

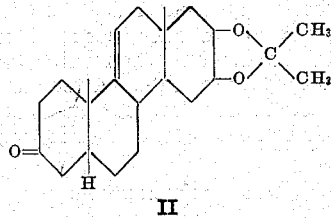

II

The dihydro derivative (II) is reduced by lithium aluminum hydride to the 3α-hydroxy derivative (III)

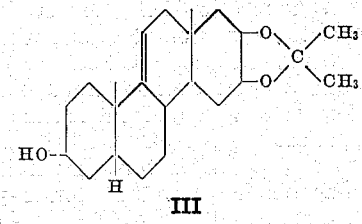

III

The 3α-hydroxy derivative (III) is converted to the dialdehyde (IV) by oxidation with periodic acid in an aqueous organic solvent.

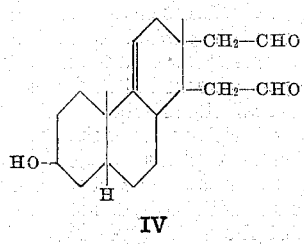

IV

The dialdehyde (IV) is cyclized by heating in an organic solvent, preferably in the presence of a carboxylic acid salt of an organic nitrogen base, to the 17-aldehyde steroid (V).

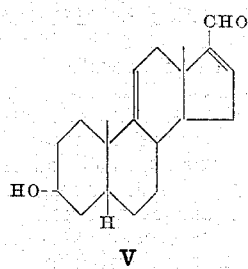

V

The aldehyde steroid (V) is hydrogenated to the 16,17-dihydro derivative (VI)

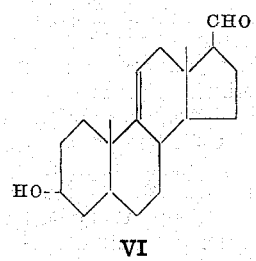

VI and the 16,17-dihydro compound (VI) is reacted with methyl magnesium iodide to give a mixture of C-20 epimeric $\Delta^{9(11)}$-pregnene-3α,20-diols, which are hydrogenated to the pregnane-3α-20-diols and the latter oxidized with chromic acid to pregnane-3,20-dione. The latter may be converted by well known methods of bromination and debromination to progesterone.

The following specific examples are illustrative of the methods and compounds of the invention:

3-keto-16,17-dihydroxy-$\Delta^{9(11)}$-homoandrostene acetonide (II)

A suspension of 23 mg. of palladium black in 20 ml. of absolute methanol is made basic by the addition of two drops of a 10% aqueous solution of sodium hydroxide, 133.4 mg. of the diene (I) is added, and the mixture shaken in an atmosphere of hydrogen until the absorption of hydrogen ceases. Celite is added, the solution is filtered and the filtrate is evaporated to dryness. The product is chromatographed on five grams of neutral alumina and the benzene eluate fractionally recrystallizes from isopropyl ether yielding 118 mg. of II; M. P. 152–153° C. A catalyst of 2% palladium on strontium carbonate may be substituted for the palladium black.

$3\alpha,16,17$ - trihydroxy - $\Delta^{9(11)}$ - homoandrostene acetonide (III)

A solution of 143.2 mg. of II in 10 cc. of anhydrous ether is added during five minutes to a stirred solution of lithium aluminum hydride in 15 cc. of ether and the mixture stirred for 45 minutes at 30° C. Ethyl acetate is added until the vigorous reaction ceases; then a saturated solution of sodium sulfate is added until the flocculent material settles, forming a viscous tar. The ether layer is decanted and the residual tar is washed several times with ether. The ether phase is washed with water until the wash water is neutral, each aqueous phase being in turn washed with ether, and the ether extracts combined and dried with anhydrous sodium sulfate. Evaporation of the ether gives 150 mg. of a crystalline product which on recrystallization from isopropyl ether melts at 172–174° C.

$3\alpha$ - hydroxy - 17 - formyl - $\Delta^{9(11),16}$ - androstadiene (V)

A solution of 325.5 mg. of III in 20 cc. of dioxane is cooled to 0° C., a solution of 450 mg. of periodic acid dihydrate in 5 cc. of water is added and the solution is held at 5° C. in atmosphere of nitrogen for twenty hours. The solution is extracted with ether and the ether phase washed with 10% aqueous bicarbonate solution and then with water. The aqueous solutions are extracted with ether and the extracts combined with the main ether extract. The ether is evaporated and the resulting tarry material containing the dialdehyde (IV) is dried in a vacuum desiccator. The dialdehyde has not been obtained in crystalline form.

The dialdehyde (IV) is dissolved in 30 cc. of anhydrous benzene, a mixture of glacial acetic acid (4 drops), piperidine (3 drops) and anhydrous sodium sulfate (2 g.) is added and the mixture held at 50° C. for three hours in a nitrogen atmosphere. The cyclization takes place similarly at lower temperatures but at a slower rate. Ether is added and the resulting solution is washed successively with aqueous hydrochloric acid (0.1 N), aqueous sodium carbonate (10%) and water. The ether solution is dried and the ether evaporated giving a crystalline product which on recrystallization from ether-petroleum ether gives 202 mg. of the aldehyde (V); melting point 182–184° C.

$3\alpha$-hydroxy-17-formyl-$\Delta^{9(11)}$-androstene (VI)

A solution of 749.3 mg. of the unsaturated aldehyde (V) in 25 cc. of benzene is shaken with 722 mg. of palladium-strontium carbonate catalyst in hydrogen at 27° C. After ten minutes the brown catalyst turns black and hydrogen absorption starts, continuing until one mole of hydrogen has been absorbed. The catalyst and solvent are removed leaving a tarry residue containing the $\Delta^{9(11)}$-androstene derivative (VI).

$\Delta^{9(11)}$-Pregnene-$3\alpha,20$-diol

A solution of 451 mg. of the androstene (VI) in 15 cc. of anhydrous benzene is added to a solution of methyl magnesium bromide in 30 cc. of anhydrous ether and the resulting suspension is refluxed for ninety minutes. Additional ether is added and the mixture is washed with aqueous hydrochloric acid (0.5 N), aqeos sodium carbonate (10%) and water. The ether solution is dried and the solvent evaporated leaving a glass containing the C-20 epiisomers of $\Delta^{9(11)}$-pregnene-$3\alpha,20$-diol.

$\Delta^{9(11)}$-Pregnene-3,20-dione

A solution of 217 mg. of the mixed isomers of $\Delta^{9(11)}$-pregnene-3,20-diol in 15 cc. of acetonitrile is cooled to 10° C. and a 1.5 N solution of chromic acid in 12 N sulfuric acid is added dropwise until a permanent yellow color appears in the organic phase, requiring about four equivalents of chromic acid. The color is discharged with isopropanol, the phases separated and the organic layer washed with sodium carbonate solution (10%) and water, and then dried over anhydrous sodium sulfate. The solvent is removed yielding 20 mg. of crude pregnene dione, which when chromatographed on 6 g. of neutral alumina, eluted with 50% benzene–50% petroleum ether, and crystallization from ether melted at 125–127° C.

$3\alpha,20$-pregnanediol

To a solution of the mixed isomers of $\Delta^{9(11)}$-pregnene-$3\alpha,20$-diol in 20 cc. of glacial acetic acid is added 300 mg. of platinum oxide and the mixture is shaken in hydrogen at 100° C. and 50 p. s. i. for ninety minutes. One gram of Celite is added, the solid filtered off and the solution evaporated under vacuum to a glassy residue. This is dissolved in ethanol (10 cc.); water is added (10 cc.), then sodium hydroxide (1 g.) and the mixture refluxed under nitrogen for one hour. The aqueous phase is separated and extracted with chloroform and ethyl acetate. The combined extracts are washed with dilute hydrochloric acid (1.0 N) and then with a saturated solution of sodium sulfate. After drying over anhydrous sodium sulfate the solvent is removed leaving a tar containing the isomeric $3\alpha,20$-pregnanediols.

3,20-pregnanedione 800 mg. of the mixture of $3\alpha,20$-pregnanediols obtained as above are oxidized to pregnanedione by the method described above for oxidation of the $\Delta^{9(11)}$-pregnane-$3\alpha,20$-diol. The crude product is chromatographed on 25 g. of neutral alumina and eluted with 50% benzene–50% petroleum ether. Recrystallization from petroleum gives needles of 3,20-pregnanedione, melting at 117–118° C., and having an infrared spectrum identical to that of the natural pregnanedione.

This application is a continuation-in-part of my application Serial No. 220,977, filed April 13, 1951.

I claim:
1. Compounds of the group consisting of the 17-aldehyde steroids of the formula

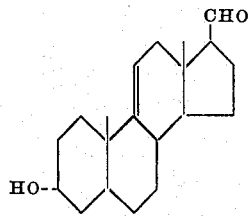

and

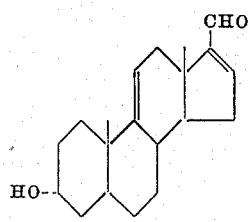

2. The 17-aldehyde steroid of the formula

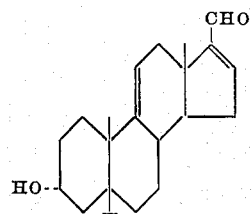

3. The method which comprises heating a solution of a compound of the formula

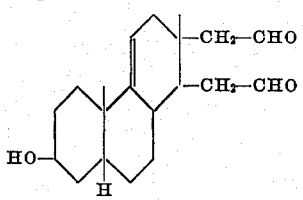

in an organic solvent in the presence of a carboxylic acid salt of an organic nitrogen base and recovering the 17-aldehyde steroid thereby produced.

4. The method which comprises heating a solution of a compound of the formula

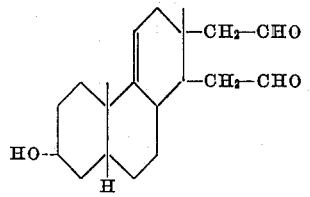

in an aromatic hydrocarbon solvent in the presence of a carboxylic acid salt of an organic nitrogen base and recovering the 17-aldehyde steroid thereby produced.

5. The method which comprises heating a solution of a compound of the formula

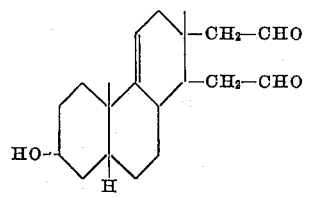

in an aromatic hydrocarbon solvent in the presence of piperidine acetate nitrogen base and recovering the 17-aldehyde steroid thereby produced.

References Cited in the file of this patent
UNITED STATES PATENTS

| Number | Name | Date |
|---|---|---|
| 2,337,271 | Reichstein | Dec. 21, 1943 |
| 2,344,992 | Logemann | Mar. 28, 1944 |
| 2,533,124 | Levin | Dec. 5, 1950 |
| 2,623,054 | Levin | Dec. 23, 1952 |